(12) United States Patent
Gwin et al.

(10) Patent No.: US 9,560,143 B2
(45) Date of Patent: Jan. 31, 2017

(54) SYSTEM AND METHOD FOR AUTOMATIC SESSION DATA TRANSFER BETWEEN COMPUTING DEVICES BASED ON ZONE TRANSITION DETECTION

(71) Applicant: Intel Corporation, Santa Clara, CA (US)

(72) Inventors: Paul J. Gwin, Orangevale, CA (US); William S. Bollengier, El Dorado Hills, CA (US); Hong W. Wong, Portland, OR (US); James M. Okuley, Portland, OR (US); Duncan Glendinning, Chandler, AZ (US); Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 14/317,341

(22) Filed: Jun. 27, 2014

(65) Prior Publication Data

US 2015/0381740 A1 Dec. 31, 2015

(51) Int. Cl.
*H04L 29/08* (2006.01)
*H04W 4/00* (2009.01)
(Continued)

(52) U.S. Cl.
CPC ............ *H04L 67/142* (2013.01); *H04W 4/008* (2013.01); *H04W 12/06* (2013.01)

(58) Field of Classification Search
CPC ........ H04W 4/001; H04W 4/008; H04W 4/00; H04W 4/16; H04W 36/24; H04W 64/006; H04W 76/043; H04W 84/18; H04W 8/005; H04W 8/18; H04W 92/18; H04B 5/0031; H04B 5/0062; H04L 65/1006; H04L 67/12; H04M 2203/2094; H04M 3/42348; H04M 3/56
(Continued)

(56) References Cited

U.S. PATENT DOCUMENTS 7,539,490 B2 * 5/2009 Dickinson ............ H04W 92/02
455/432.1
7,634,269 B2 * 12/2009 Gallagher ............. H04W 16/16
370/331
(Continued)

FOREIGN PATENT DOCUMENTS

| EP | 2 533 493 A1 | 12/2012 |
|---|---|---|
| TW | 201408110 A | 2/2014 |
| WO | 2015/199827 A1 | 12/2015 |

OTHER PUBLICATIONS

International Search Report and Written Opinion received for PCT Patent Application No. PCT/US2015/030517, mailed on Aug. 27, 2015, 14 pages.
(Continued)

*Primary Examiner* — Alina N Boutah
(74) *Attorney, Agent, or Firm* — Inventive Patent Law, P.C.; Jim H. Salter

(57) ABSTRACT

A system and method for automatic session data transfer between computing devices based on zone transition detection are disclosed. A particular embodiment is configured to: determine if a mobile or wearable computing device is located within a proximity zone around a location of a stationary computing device; establish an authorized wireless data connection with the mobile or wearable computing device via a wireless transceiver; determine if the mobile or wearable computing device is likely departing the proximity zone and if so, upload user session data to the mobile or wearable computing device; and determine if the mobile or wearable computing device is likely approaching the sta-
(Continued)

tionary computing device and if so, download user session data from the mobile or wearable computing device.

15 Claims, 13 Drawing Sheets

(51) Int. Cl.
*H04W 12/06* (2009.01)
*G06F 1/16* (2006.01)

(58) Field of Classification Search
USPC ....... 455/41.2, 416, 41.1, 168.1, 182.2, 440; 340/5.61; 709/227, 228
See application file for complete search history.

(56) References Cited

U.S. PATENT DOCUMENTS

| | | | | |
|---|---|---|---|---|
| 7,869,435 B2* | 1/2011 | Seguchi | ................ | H04W 8/02 370/392 |
| 8,145,218 B2* | 3/2012 | Hyziak | ................ | H04W 36/30 455/429 |
| 2001/0041594 A1* | 11/2001 | Arazi | ................ | H04M 1/725 455/561 |
| 2004/0009749 A1* | 1/2004 | Arazi | ................ | H04W 36/08 455/41.2 |
| 2004/0053613 A1* | 3/2004 | Karaoguz | ............... | H04W 8/20 455/436 |
| 2004/0202120 A1* | 10/2004 | Hanson | ................ | H04W 36/30 370/328 |
| 2004/0214574 A1* | 10/2004 | Eyuboglu | ............. | H04J 3/0682 455/439 |
| 2005/0005025 A1* | 1/2005 | Harville | ............ | H04L 29/06027 709/241 |
| 2005/0221829 A1* | 10/2005 | Nishida | ................ | G01S 11/06 455/440 |
| 2006/0026288 A1* | 2/2006 | Acharya | ................ | G06Q 10/10 709/227 |
| 2006/0146767 A1* | 7/2006 | Moganti | ................ | H04L 67/30 370/338 |
| 2006/0288095 A1* | 12/2006 | Torok | ................ | G06F 19/327 709/223 |
| 2007/0189220 A1* | 8/2007 | Oberle | ............. | H04L 29/06027 370/331 |
| 2007/0223370 A1* | 9/2007 | Spear | ................ | H04L 69/163 370/218 |
| 2009/0157799 A1* | 6/2009 | Sukumaran | ............ | G06Q 10/10 709/203 |
| 2009/0290555 A1* | 11/2009 | Alpert | ................ | H04W 4/20 370/331 |
| 2009/0291686 A1* | 11/2009 | Alpert | ............... | H04W 36/0083 455/436 |
| 2010/0228863 A1* | 9/2010 | Kawauchi | ............ | H04W 76/045 709/227 |
| 2010/0304673 A1* | 12/2010 | Yoshizawa | ............ | H04W 8/005 455/41.2 |
| 2011/0065384 A1* | 3/2011 | Cader | ................ | H04M 3/58 455/41.1 |
| 2012/0102409 A1* | 4/2012 | Fan | ................ | H04W 4/00 715/738 |
| 2012/0157113 A1* | 6/2012 | Brisebois | ................ | G01S 5/00 455/456.1 |
| 2012/0311038 A1* | 12/2012 | Trinh | ................ | H04W 4/206 709/204 |
| 2013/0029635 A1* | 1/2013 | Choi-Grogan | ........ | H04W 36/14 455/405 |
| 2013/0102250 A1* | 4/2013 | Mutikainen | ......... | H04W 76/043 455/41.2 |
| 2013/0212286 A1* | 8/2013 | Krishnakumar | ...... | H04L 67/148 709/227 |
| 2013/0318249 A1* | 11/2013 | McDonough | ........... | H04L 67/02 709/228 |
| 2014/0073300 A1* | 3/2014 | Leeder | ................ | H04B 5/0031 455/416 |
| 2014/0136195 A1* | 5/2014 | Abdossalami | .......... | G10L 15/26 704/235 |
| 2014/0188990 A1* | 7/2014 | Fulks | ................ | H04L 65/403 709/204 |
| 2015/0350333 A1* | 12/2015 | Cutler | ................ | H04W 72/04 709/227 |

OTHER PUBLICATIONS

Office Action and Search Report received for Taiwanese Patent Application No. 104116263, mailed on Jul. 29, 2016, 8 pages of Taiwanese Office Action including 1 Page of English Search Report.

* cited by examiner

SYSTEM AND METHOD FOR AUTOMATIC SESSION DATA TRANSFER BETWEEN COMPUTING DEVICES BASED ON ZONE TRANSITION DETECTION

TECHNICAL FIELD

This patent application relates to electronic systems, peripheral devices, mobile devices, and computer-implemented software, according to various example embodiments, and more specifically to a system and method for automatic session data transfer between computing devices based on zone transition detection.

BACKGROUND

In existing computing environments, there are often multiple stationary computing and display devices in homes, work places, private transportable computing devices in vehicles, and computing devices in public places. As Systems-on-a-Chip (SOC's) become smaller and smaller, users can also have a wearable personal computer (PC) in the tiniest of form factors—perhaps a ring that is permanently worn, an earring, a wrist band, a nameplate, etc. However, because of their small size, these wearable devices will not typically have the ability to display information themselves and may have limited computing power. As the proliferation of these devices increases exponentially, it will become necessary for PC users to access these devices and to maintain computing continuity from one device to another. Additionally, any and all computing and Internet-connected devices (e.g., Internet of Things—IoT/Internet of Everything—IoE) are getting smaller and integrated into a variety of items. Data driven activities are becoming ubiquitous. Smart (or dumb) devices can be everywhere—in traditional computing environments, but also in non-traditional (or unexpected) ones (like fishing rods, t-shirts, toilets, etc.).

BRIEF DESCRIPTION OF THE DRAWINGS

The various embodiments are illustrated by way of example, and not by way of limitation, in the figures of the accompanying drawings in which.

DETAILED DESCRIPTION

Figure 1:
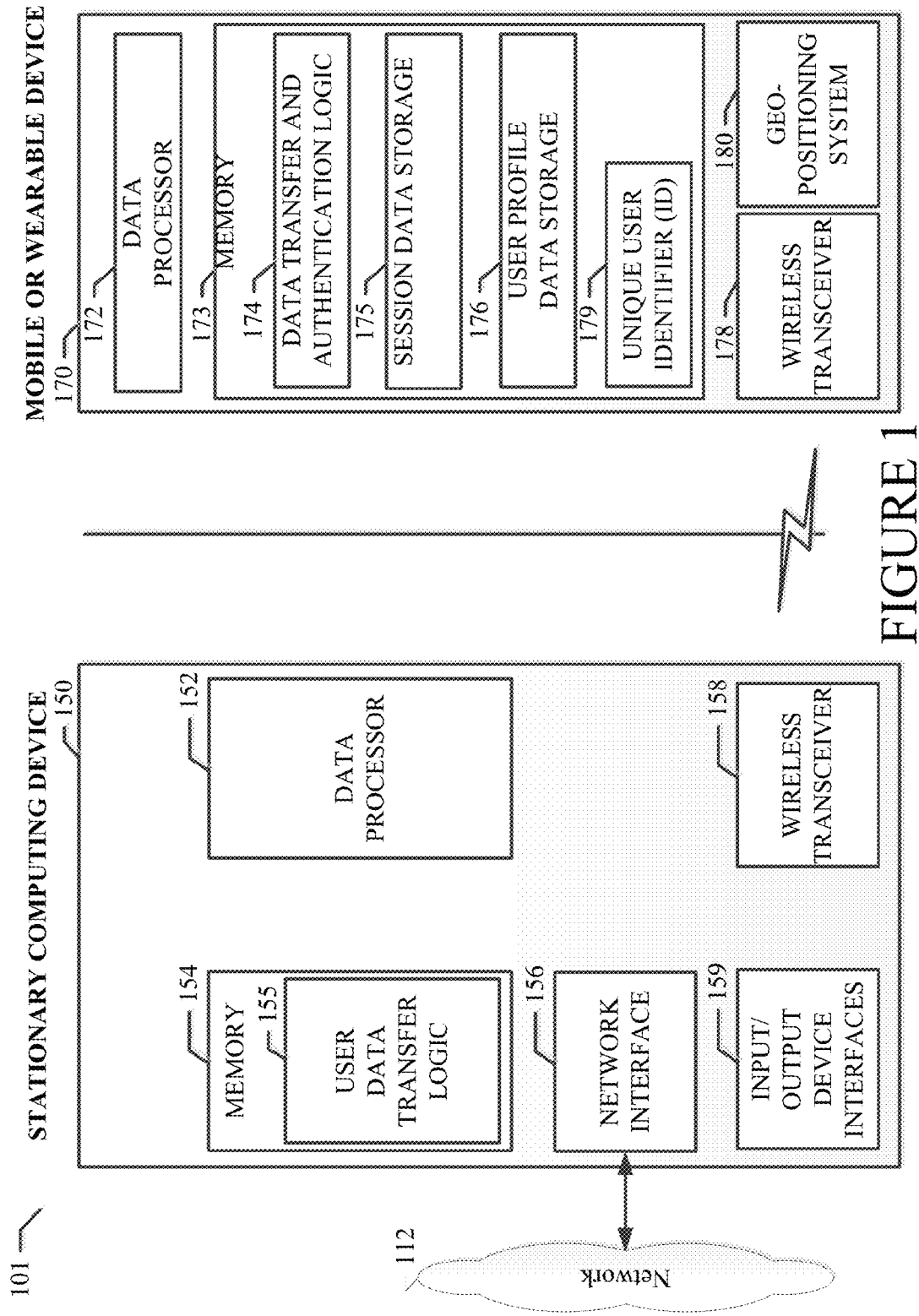
FIG. 1 illustrates an example embodiment of a system for automatic session data transfer between computing devices based on zone transition detection.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for automatic session data transfer between computing devices based on zone transition detection are disclosed. The various embodiments described herein provide various ways to determine a user's location, movement, and to detect events to ascertain the user's context, and to automatically and prospectively configure proximate computing devices based on the determined user context.

As wearable computing proliferates to micro form factor size, reliance on cloud computing or other device access will grow as many computing devices may not have a display themselves and may carry with them data or limited data of the end user. It is also common for users to move about within a location having a plurality of computing devices. It can be inconvenient to transition from one computing device to another if a computing session or context on a first computing device is not readily available on a second computing device. The various embodiments described herein provide a solution to these emerging issues. As a result, the various embodiments provide solutions for mobile identity and continuity computing.

In a particular example embodiment, a computing model supports a computing environment wherein display devices, computing access devices, and computing devices (e.g., personal computers—PCs) can be located in common or public locations, such as airplane back seats, car back seats, stores, airports, hotels, business centers, different rooms in the home, work places, and the like. In existing computing environments, there are often multiple stationary public or private computing and display devices in homes, work places, private transportable computing devices in vehicles, and computing devices in public places. As the proliferation of these devices increases exponentially, it will become common for PC users to access these devices to maintain computing continuity from one device to another.

As Systems-on-a-Chip (SOC's) become smaller and smaller, users can have a mobile computing device or wearable PC in the tiniest of form factors—perhaps a ring that is permanently worn, an earring, a wrist band, a nameplate, etc. As described herein, wearable devices are one form of mobile device. Because of their small size, these mobile or wearable devices will not typically have the ability to display information themselves and may have limited computing power. Nevertheless, the wearable PC or other type of mobile computing device can contain a user's identifying information (ID) and data, and the ability to "hand shake" or establish a data communication between itself and a multitude of other personal/private and publicly accessible stationary computing devices. The example embodiments disclosed herein use this capability of mobile or wearable computing devices to provide a user with the ability to maintain a computing session or context continuity with multiple devices in personal/private or public settings. Additionally, the example embodiments described herein provide a capability for context-aware computing and communications. For example, a person may have the birthday dates of friends and loved ones stored in his/her calendar application (app) or other birthday tracking app. As this person walks into an office supply store—for a reason unrelated to anyone's birthday—his/her presence in the store can be detected and an alert can be automatically sent to his/her phone reminding him/her of the friend's birthday and indicating that birthday cards can be found in Aisle 2 of the store in which s/he is presently located.

As disclosed herein, a computing session or context refers to a computing state in which a user is involved at a particular computing device. The computing state can include an arrangement of open user interface windows or frames, a set of active or launched software applications, a set of websites being browsed, a collection of open documents, a set of active executables, a set of active devices or network nodes, or other active functionality or combinations thereof on a computing device or in a computing environment.

As disclosed herein, a stationary computing device can refer to any form of conventional computer, computing system, data processing system, desktop system, server, public or private computer, and the like. Further, although the computing device is referred to as stationary, the stationary computing device can also refer to portable computing devices, such as laptops, tablets, notebooks, e-readers, and the like. In this context, a stationary computing device, regardless of form factor, is one which doesn't travel with the user.

As examples of these common computing environments, various sample usage models are provided below:

The user may have multiple stationary PC's or mobile PC's in their residence and commonly relocates to or moves between multiple rooms. As the user leaves a first computing device, the data and session replication information of the first computing device is stored in a data storage component on the mobile or wearable computing device. Alternatively, the data and session replication information of the first computing device can be stored in network cloud storage. When the user approaches or enters a proximity zone associated with a second computing device, the second computing device can sense or detect the approaching user and automatically pre-load the data and session replication information of the first computing device from the data storage component on the mobile or wearable computing device or network cloud storage. As a result, the second computing device can be automatically configured with the session and context that the user was using on the first computing device. As a result, a user can seamlessly move between computing devices and the session and context data follows the user.

The user has checked into his/her flight via his/her phone or other personal computing device (e.g., a tablet, some other mobile or wearable computing device, etc.); as s/he approaches the terminal, the airline's computer system detects his/her presence, gets him/her in the queue for checking bags and prepares any necessary administrative work (e.g., a version of getting a boarding pass and checking bags today).

The user is looking to buy a new car. Maybe s/he has done a lot of online research and wants to go for a test drive. When s/he enters the car dealership, the dealership's computer system detects his/her presence, notifies the appropriate salesperson, greets him/her, and perhaps prepares the initial paperwork for a quote, etc.

The various embodiments described herein provide a solution in which a "personal or public" stationary computing device identifies the user. As the user approaches these computing devices, by physically moving into the proximity of these devices, the "personal or public" stationary computing device can determine that the user is likely to use the computing device (e.g., based on a vector analysis of the user's motion, etc.). Upon making this determination, the stationary computing device can prepare for the user to use the stationary computing device by pre-fetching and pre-loading data from the mobile or wearable device and/or the network cloud so that the user is ready to use/resume the session immediately at login on the new stationary computing device.

The various embodiments described herein allow the personal or public stationary computing device to determine a probability that the stationary computing device is to be used by a particular user, initiates pre-fetching of the user's session data, sequesters the user identification data (ID) from the mobile or wearable device, allows the login protocol for data access/session resume, and continues a previous computing session of the user. In a simplistic example, this allows a user working on a PC in a first room at home to get up and move to a second room that has a second computing device. When the user arrives at the second computing device, the user session is recreated automatically and the user can resume work on the second computing device without delay, without shutting down and saving files from the first device used, and without the user having to expend energy to work from a new location. This solution creates a seamless computing experience that allows a user to efficiently and without effort change work locations in the home or office and continue working "on the go".

The world is becoming very mobile. The various embodiments described herein solve multiple device usage issues for the user and make use of memory technology by persistent storage capability, which is expected to grow exponentially in the mobile or wearable computing revolution. As described herein, mobile or wearable computing devices can be used to create a seamless computing experience by virtue of several characteristics and capabilities provided in the mobile or wearable computing devices of an example embodiment. These mobile or wearable computing device characteristics and capabilities include the following:

1. The mobile or wearable computing device can establish and persistently retain a unique user identifier (ID) that travels with the user. The unique user ID can be authenticated to the user with any of a variety of well-known multi-factor authentication techniques, including passwords, biometrics, signatures, and the like. The mobile or wearable computing device can be enabled to link with a stationary computing device only when the mobile or wearable computing device is coupled with the user's authenticated unique identifier. In the example embodiment, the mobile or wearable computing device must be in continuous user ID authentication mode between the user and the mobile or wearable computing device, before the ID authentication process between the mobile or wearable computing device and the stationary device can begin. This is a method of security to enable a secure communication handshake between the mobile or wearable computing device and the stationary computing device.

2. The mobile or wearable device can persistently retain recent data necessary for recreating a computing session on a second computing device that is identical or near identical to a computing session left behind on a first computing device. Additionally, the retained data can include data for identifying preferences that are applicable to the user and the user's current situation (e.g., arriving at an airport, entering a car dealership, or the like).

3. By observing a vector of motion of the user approaching or departing a stationary computing device (e.g., using long range radio frequency identification (RFID) technology, global positioning system or satellite (GPS) data analysis, data from other geo-positioning systems, or the like), user session data can be triggered for upload or download to/from the mobile or wearable computing device or the network cloud. If the analysis of the vector determines the user is departing the stationary computing device, the user session data can be triggered for upload to a data storage device of the mobile or wearable computing device or the network cloud from the stationary computing device. If the analysis of the vector determines the user is approaching the stationary computing device, the user session data from a different computing device can be triggered for download to the approached stationary computing device from the data storage device of the mobile or wearable computing device or the network cloud. In this manner, the user session data can be preloaded into the approached stationary computing device from the mobile or wearable computing device or the network cloud and become accessible immediately at login (e.g., no waiting to resume work). In another embodiment, historical or behavioral user data can be used to determine a pattern of user behavior on one or more stationary computing devices. For example, a particular user may have a pattern of typically moving between and accessing two stationary computing devices. This pattern of user behavior can be used to predict likely user action. This predicted user action can also be used to trigger the speculative upload or download of user session data. Additionally, the predicted user action can be used in conjunction with or separately from the vector analysis as described above.

4. User profile data contained on the mobile or wearable computing device can work in conjunction with the network cloud and local environment data to offer the user knowledge and options related to the local environment (e.g., favorite coffee shop, points of interest, attractions, etc.). The user profile data can include data specifying a particular user's demographics, affinity, preferences, and the like.

5. Because mobile or wearable computing devices don't typically need to support display devices or robust user interfaces, the physical device volume of the mobile or wearable computing device can be substantially allocated to persistent data storage (e.g., solid state drives—SSDs).

By use of these and other advantages of mobile or wearable computing devices, the various example embodiments described herein provide a complete computing experience with user session and profile data being retained semi-permanently on a mobile or wearable computing device. The various example embodiments described herein allow a complete computing experience by augmenting the minimal computing power of the mobile or wearable device with the computing power of other proximate devices. Users won't be locked out of a computing environment because their own computing device may not be available. Their data is always with them, always accessible, and convenient to carry. In a home or office network environment, multiple PC's can duplicate the user's configuration instantly as they pass from one room/office to the next.

As described in more detail below, when a person carrying a mobile computing device or wearing a wearable computing device approaches a stationary computing device, the mobile or wearable computing device can be recognized by the stationary computing device using a unique user ID retained in a data storage device of the mobile or wearable computing device. The user ID can be transmitted (in an encrypted form) from the mobile or wearable computing device to the stationary computing device via a wireless data signal (e.g., long range RFID, Bluetooth, radio frequency—RF, etc.) for processing by the stationary computing device. Alternatively, the user ID can be authenticated in relation to a particular stationary computing device by the mobile or wearable computing device itself upon request from a particular stationary computing device. The stationary computing device can analyze the motion path or vector of the mobile or wearable computing device (and thus the motion path or vector of the user) and determine a probability that the user is approaching and intends to use the stationary computing device. Upon determining a likelihood of user access, the stationary computing device can download user session data from the data storage device of the mobile or wearable computing device. Alternatively, the stationary computing device can use the unique user ID to download current user session data from the network cloud. When the stationary computing device has obtained the user session data using the described methods, the user session data is pre-loaded into the stationary computing device in the background and made ready to be instantly accessed after user authentication is completed at the stationary computing device. If the user logs into the stationary computing device, the pre-loaded user session data can be instantly used to configure the stationary computing device to a state and context that is identical or nearly identical to the computing state and context the user was in at a previous computing device. As a result, the user can experience a seamless transition from a previous computing session to a current computing session on different computing devices.

The stationary computing device can also obtain user profile or affinity data from the mobile or wearable computing device or the network cloud to link items or attractions of interest to the particular user based on the user's user profile or affinity data. Moreover, the stationary computing device can also use the user's user profile or affinity data obtained from the wearable computing device or the network cloud to search the local environment (e.g., places nearby, shops, events, history, etc.) for potential interest matches to make these local items or attractions of interest known to the user.

Referring now to FIG. 1, an example embodiment of a system 101 for automatic session data transfer between computing devices based on zone transition detection is disclosed. In the example embodiment shown, a stationary computing device 150 is in data communication with a mobile or wearable computing device 170. In the example embodiment, the stationary computing device 150 can be any of a variety of conventional computing devices, such as those listed above. In general, such devices include a data processor 152, a memory 154, a network interface 156, a wireless transceiver 158, and input/output (I/O) interfaces 159. The network interface 156 enables the stationary computing device 150 to communicate with a network cloud 112, such as the Internet, using well-known techniques and protocols. Additionally, the example embodiment includes user data transfer logic 155, which can represent software or executable logic retained in memory 154 and executed by data processor 152. The functionality and operation of the user data transfer logic 155 of the example embodiment is described in more detail below.

The example system 101 also includes a mobile or wearable computing device 170. In the example embodiment, the mobile or wearable computing device 170 can include a data processor 172, a memory 173, a wireless transceiver 178, and optionally a geo-positioning system 180. The wireless transceiver 178 enables the mobile or wearable computing device 170 to communicate with the wireless transceiver 158 of stationary computing device 150 to wirelessly transfer data between devices. The geo-positioning system 180 enables the mobile or wearable computing device 170 to communicate geographical positioning data to a stationary computing device. Such geo-positioning systems, such as long range radio frequency identification (RFID) technology or global positioning system or satellite (GPS) technology, are well-known in the art. The mobile or wearable computing device 170 of the example embodiment can also include data transfer and authentication logic 174, which can represent software or executable logic retained in memory 173 and executed by data processor 172. The functionality and operation of the data transfer and authentication logic 174 of the example embodiment is described in more detail below. The memory 173 of mobile or wearable computing device 170 of the example embodiment can also include session data storage 175 and user profile data storage 176. As described in more detail below, the session data storage 175 can retain user session data and context data used to recreate on a second computing device a computing session initiated on a first computing device. User profile data storage 176 is used to retain user profile or affinity data, preferences, and the like, which can be used to query for items or attractions that may be of interest to a user in a particular location. Unique user identifier (ID) 179 can be a data item or object stored in memory 173, which uniquely identifies a user associated with a particular mobile or wearable device 170. As described above, the unique user ID can be authenticated to the user with any of a variety of well-known multi-factor authentication techniques, including passwords, biometrics, signatures, and the like.

Figure 2:
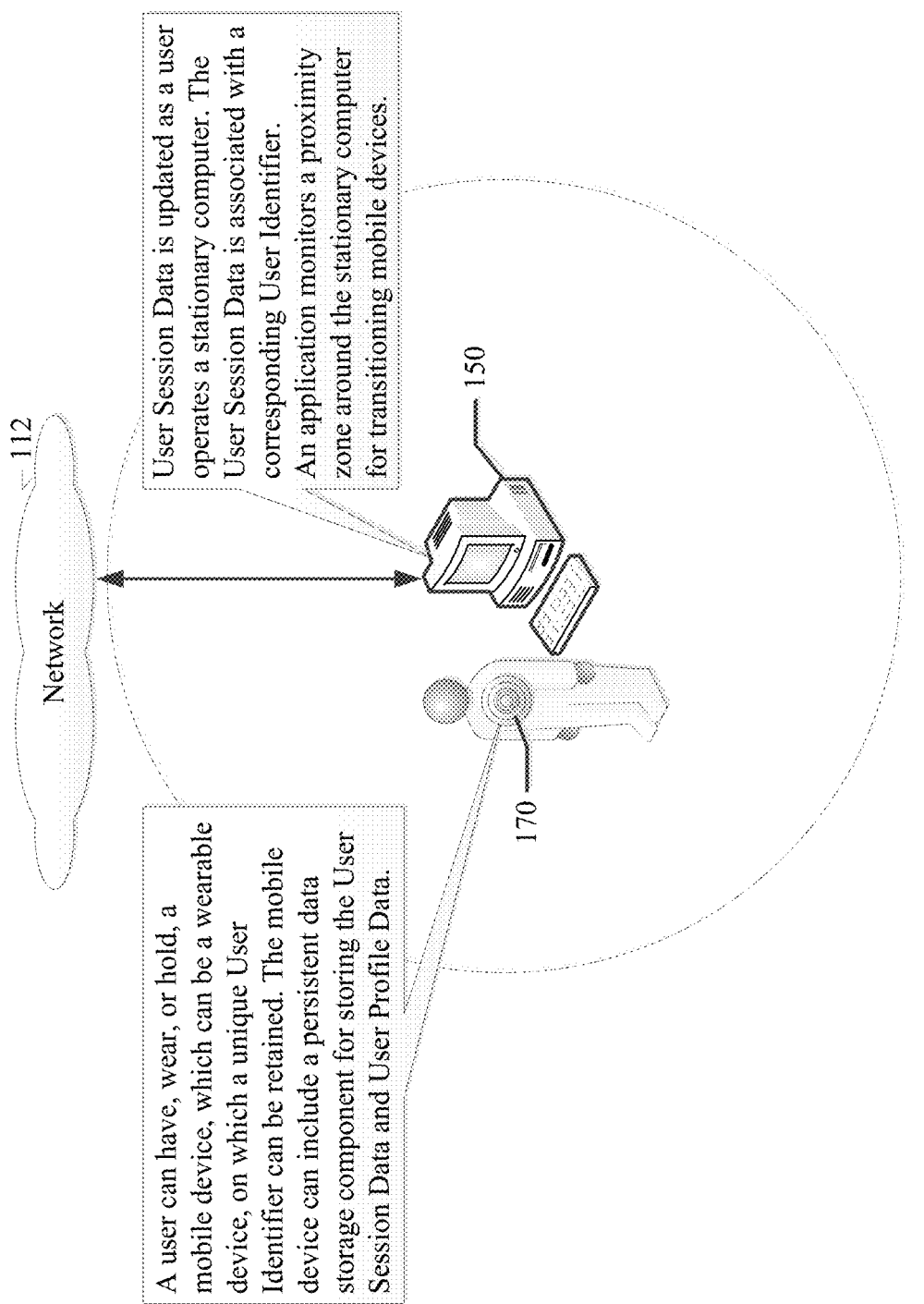
FIG. 2 illustrates an example embodiment wherein a stationary computing device can have an associated proximity zone.
Figure 3:
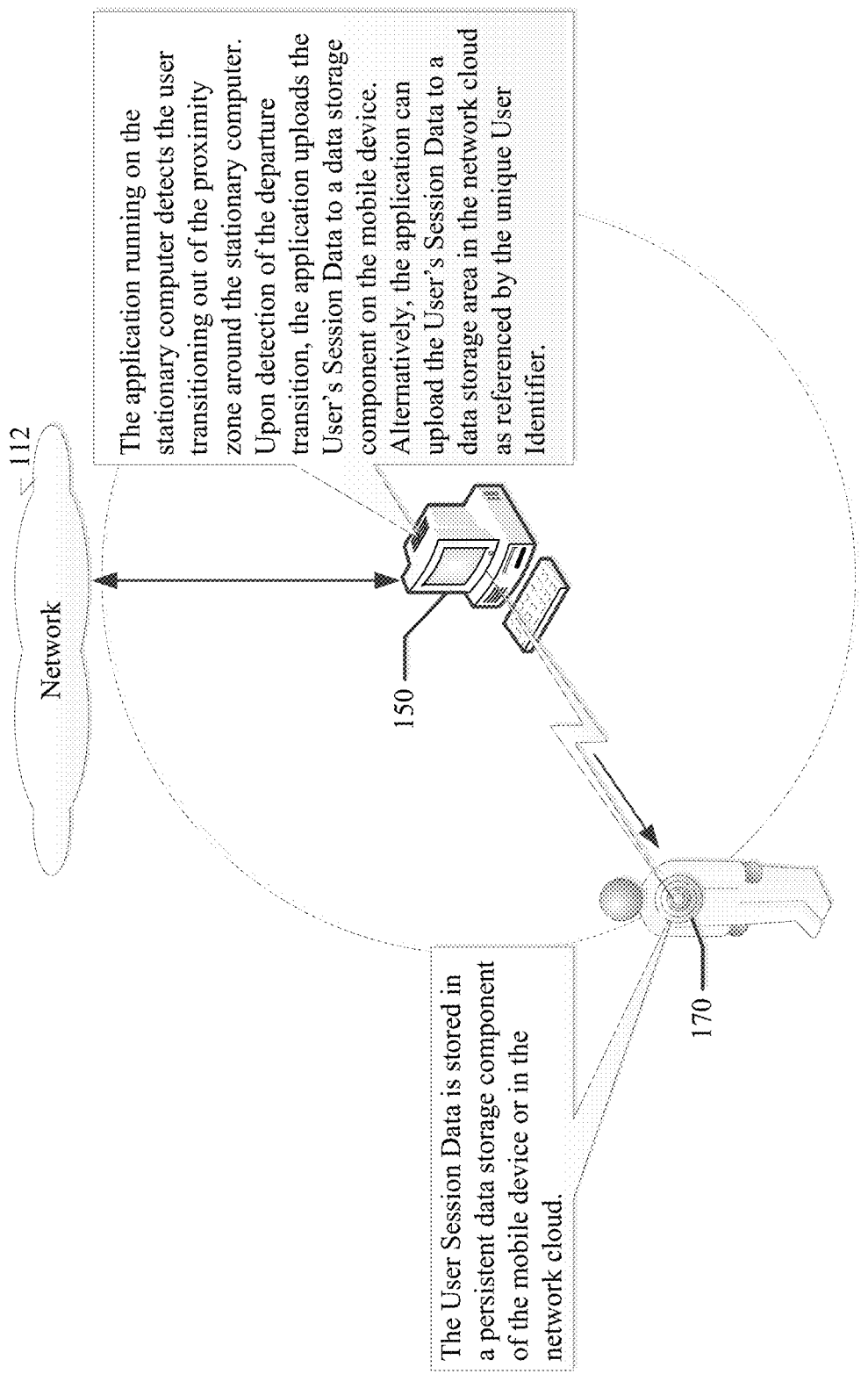
FIG. 3 illustrates an example embodiment wherein a mobile device is detected to be exiting a proximity zone of a stationary computing device.
Figure 4:
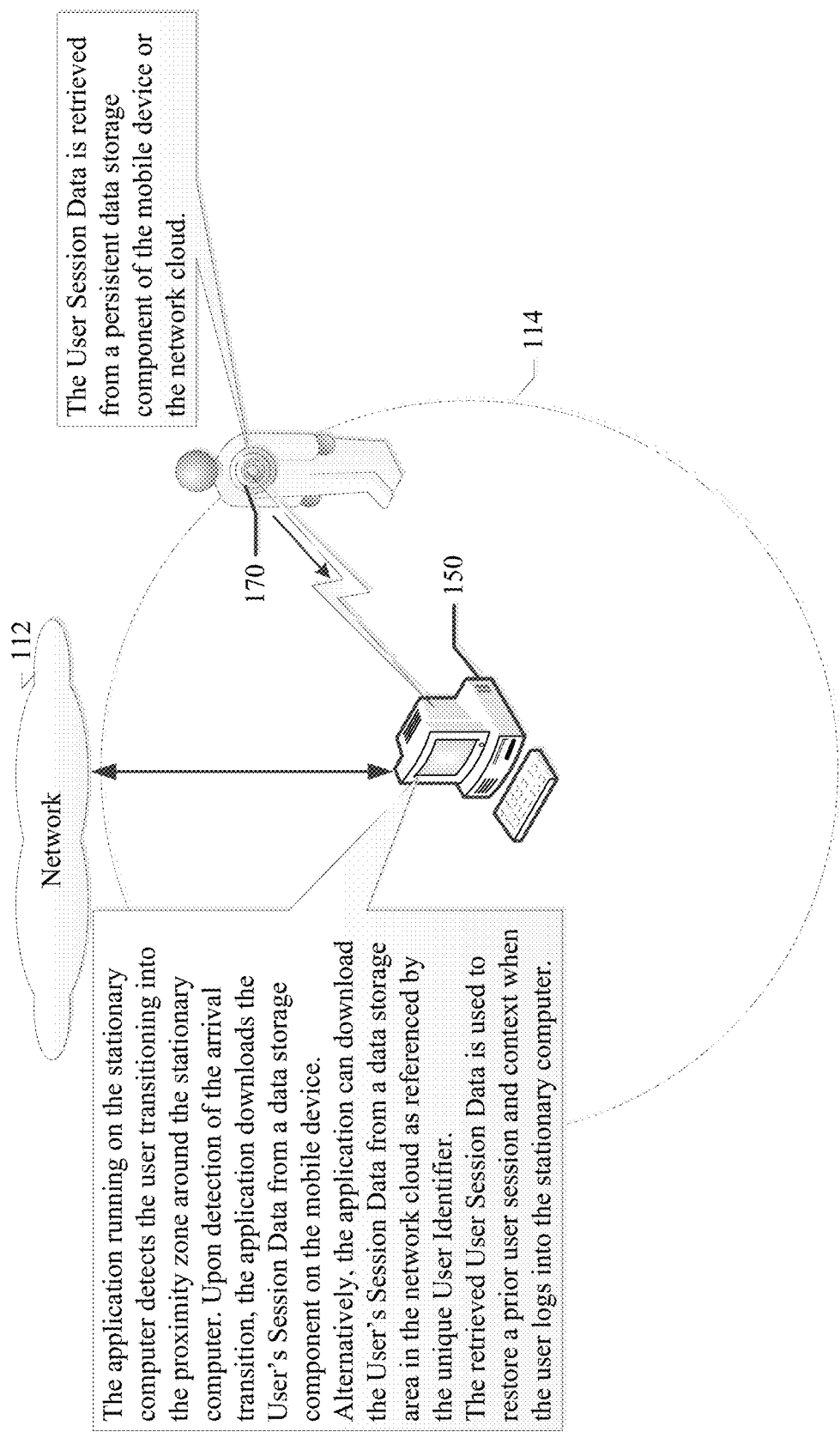
FIG. 4 illustrates an example embodiment wherein a mobile device is detected to be entering a proximity zone of a stationary computing device.

Referring now to FIGS. 2 through 4, an example embodiment is illustrated in which a stationary computing device can be configured to detect a proximity zone transition performed by a mobile or wearable computing device departing or approaching the proximity zone of the stationary computing device. Referring to FIG. 2, an example embodiment is depicted wherein a stationary computing device 150 can have an associated proximity zone 114. Proximity zone 114 can be pre-configured or pre-defined for a particular stationary computing device based on a variety of factors including, the power level of the wireless transceiver 158 of the stationary computing device 150, the level of ambient radio interference, the dimensions and/or shape of a room or enclosure in which the stationary computing device 150 is located, or the like. In general, the diameter or dimensions of proximity zone 114 can be pre-configured or pre-defined to correlate with a likelihood that when a user enters the proximity zone 114, the user is likely to log into and use the stationary computing device 150. Similarly, the diameter or dimensions of proximity zone 114 can be pre-configured or pre-defined to correlate with a likelihood that when a user exits the proximity zone 114, the user is unlikely to continue using the stationary computing device 150. As shown in FIG. 2, a user can have, wear, or hold, a mobile device 170, which can be a wearable device, on which a unique user identifier can be retained. The unique user identifier can be retained in storage area 179 as described above. The mobile device 170 can also include a persistent data storage component or memory 173 for storing the user session data and user profile data in storage areas 175 and 176, respectively. As the user shown in the example of FIG. 2 uses the stationary computing device 150, the user's session data can be updated and retained in a memory of the stationary computing device 150. In one embodiment, the user's session data can be periodically saved on the proximate mobile device 170 and the session data storage 175 thereon. Additionally, the user's session data can be periodically saved to a data storage area in the network cloud 112 via a network access. The user's session data saved in the network cloud 112 can be indexed using the unique user identifier and optionally an identifier of the stationary computing device 150 and/or an identifier of the mobile device 170. In this manner, the content of the retained user's session data corresponds to a near real time representation of the user's computing session and context on the stationary computing device 150. As long as the user remains within the proximity zone 114 around the stationary computing device 150, the user's session data continues to be updated in the stationary computing device 150, the mobile device 170, and/or the network cloud 112. Additionally, as the user operates the stationary computing device 150, the user's profile data, affinity data, and/or preferences can be retained or updated on the stationary computing device 150, the mobile device 170, and/or the network cloud 112. The user's profile data, affinity data, and/or preferences can be retained on the mobile device 170 in the user profile data storage area 176 as described above.

Referring still to FIG. 2, the user data transfer logic 155 of stationary computing device 150 is configured to monitor the proximity zone 114 for transitioning mobile devices. The detection of a mobile device entering, arriving, or transitioning into the proximity zone 114 can be determined when a new handshake signal is received from an entering mobile device that was not previously detected. These handshake signals can be received as wireless signals by the wireless transceiver 158. The receipt and use of such handshake signals is well-known in the art. Additionally, the physical location of the entering mobile device can also be determined using well-known techniques (e.g., using long range radio frequency identification (RFID) technology, global positioning system or satellite (GPS) data analysis, or the like). The physical location of the entering mobile device can be determined as an absolute physical location or as a physical location relative to the location of the stationary computing device 150. In this manner, the presence and location of a new mobile device transitioning into the proximity zone 114 of the stationary computing device 150 can be detected. Similarly, the user data transfer logic 155 of stationary computing device 150 is configured to monitor the proximity zone 114 for mobile devices transitioning out of the proximity zone. For example, the user data transfer logic 155 can periodically ping the known mobile devices in the proximity zone 114 for their status and location. If a particular mobile device fails to respond to the ping, the user data transfer logic 155 can assume that the mobile device has transitioned out of the proximity zone 114. Additionally, as described in more detail below, the user data transfer logic 155 can monitor the motion of the mobile devices within the proximity zone 114 and use a path of motion or a motion vector to determine that a particular mobile device is likely on a path departing the proximity zone 114. The use of a path of motion or a motion vector in an example embodiment is described in more detail below.

Referring now to FIG. 3, an example embodiment is illustrated wherein a mobile device is detected to be exiting a proximity zone 114 of stationary computing device 150. As shown in FIG. 3, a person holding or wearing a mobile or wearable device 170 is transitioning from within the proximity zone 114 to an area outside of the proximity zone 114. This transition can be detected using any of the techniques described above. Upon detection of a mobile or wearable device 170 exiting the proximity zone 114, the user data transfer logic 155 of stationary computing device 150 can initiate an upload of user session data and user profile data from the stationary computing device 150 to the session data storage area 175 of mobile or wearable device 170. The session data upload can be accomplished wirelessly using the wireless transceivers 158 and 178 and conventional data transfer protocols. Alternatively or in addition to the session data upload to the mobile or wearable device 170, the stationary computing device 150 can upload the session data from the stationary computing device 150 to a data storage area in network cloud 112. As described above, the unique user ID can be used to index the user's session data in the network cloud 112. In a similar fashion, the user's profile or affinity data and preference data can be uploaded to the mobile or wearable device 170 and/or the data storage area in network cloud 112. Thus, as described herein for an example embodiment, upon detection of a mobile or wearable device 170 transitioning out of a proximity zone 114 of a stationary computing device 150, the stationary computing device 150 can initiate an upload of the user's session data and profile data to a data storage area of the mobile or wearable device 170 and/or a data storage area in network cloud 112. The uploaded user's session data and profile data can be retained until the user and a mobile or wearable device being held or worn by the user transitions into the proximity zone of another computing device as described below.

Referring now to FIG. 4, an example embodiment is illustrated wherein a mobile device is detected to be entering a proximity zone 114 of stationary computing device 150. As shown in FIG. 4, a person holding or wearing a mobile or wearable device 170 is transitioning from an area outside of the proximity zone 114 to an area within the proximity zone 114. This transition can be detected using any of the techniques described above. Upon detection of a mobile or wearable device 170 entering the proximity zone 114, the user data transfer logic 155 of stationary computing device 150 can initiate a download of user session data from the session data storage area 175 of mobile or wearable device 170 to the stationary computing device 150. The session data download can be accomplished wirelessly using the wireless transceivers 158 and 178 and conventional data transfer protocols. Alternatively, the session data can be downloaded to the stationary computing device 150 from a data storage area in network cloud 112. As described above, the unique user ID can be used to index the user's session data in the network cloud 112. In a similar fashion, the user's profile or affinity data and preference data can be downloaded from the mobile or wearable device 170 or from the data storage area in network cloud 112. Thus, as described herein for an example embodiment, upon detection of a mobile or wearable device 170 transitioning into a proximity zone 114 of a stationary computing device 150, the stationary computing device 150 can authenticate the mobile or wearable device 170 and initiate a download of the user's session data and profile data from a data storage area of the mobile or wearable device 170 or from a data storage area in network cloud 112. The mobile or wearable computing device 170 can be authenticated and enabled to link with the stationary computing device 150 only when the mobile or wearable computing device 170 is coupled with the user's authenticated unique identifier. The downloaded user's session data and profile data can be retained in the stationary computing device 150 until the user logs into the stationary computing device 150. At that time, the user's session data can be used to recreate a computing session on the current stationary computing device 150 that is identical or near identical to a computing session left behind on a prior computing device. Additionally, the downloaded user profile or affinity data can be used for identifying items, attractions, or preferences that are applicable to the user and the user's current situation (e.g., arriving at an airport, entering a car dealership, or the like).

Figure 5:
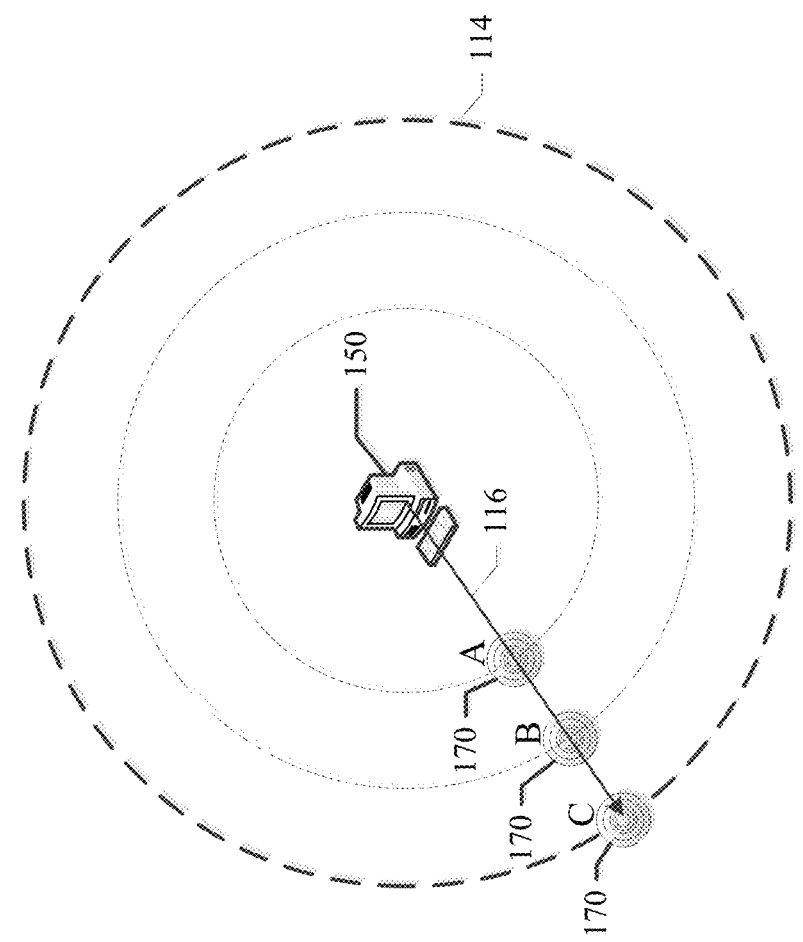
FIG. 5 illustrates an example embodiment wherein a path of motion or a motion vector is used to determine that a particular mobile device is likely on a path departing the proximity zone.

Referring now to FIGS. 5 through 8, example embodiments are illustrated wherein a path of motion or a motion vector is used to determine that a particular mobile device is likely on a path departing or entering the proximity zone 114. Referring now to FIG. 5, an example embodiment is illustrated wherein a path of motion or a motion vector is used to determine that a particular mobile device is likely on a path departing the proximity zone 114. As described above, the stationary computing device 150 can determine the physical location of a mobile or wearable computing device 170 within proximity zone 114 using well-known techniques (e.g., using long range radio frequency identification (RFID) technology, global positioning system or satellite (GPS) data analysis, or the like). The physical location of the mobile or wearable computing device 170 can be determined as an absolute physical location or as a physical location relative to the location of the stationary computing device 150. In this manner, the presence and location of a mobile or wearable computing device 170 within the proximity zone 114 of the stationary computing device 150 can be detected. As shown in FIG. 5, the physical location of the mobile or wearable computing device 170 within the proximity zone 114 can be determined at predefined time intervals, A, B, and C. Given the physical position of the mobile or wearable computing device 170 and the time at the corresponding position for at least two time intervals, the speed and direction of travel can be determined for the mobile or wearable computing device 170. This speed and direction can be represented as a motion vector 116 as shown in FIG. 5. This motion vector 116 can be used by the stationary computing device 150 to determine if it is likely that a user is finished using a particular stationary computing device 150 and is intending to depart the proximity zone 114. In the example shown in FIG. 5, the position of the mobile or wearable computing device 170 has been determined at times A, B, and C. The resulting motion vector 116 has been produced. The motion vector 116 indicates that the path and speed of the mobile or wearable computing device 170 is indicative of and consistent with the behavior of a user who is finished using a particular stationary computing device 150 and is intending to depart the proximity zone 114. One indicia of this likely user behavior is the fact that the motion vector 116 in the example of FIG. 5 points directly away from the stationary computing device 150. As a result of this determination of a likely departure of the mobile or wearable computing device 170 from the proximity zone 114, the stationary computing device 150 can initiate an upload of user session data and user profile data from the stationary computing device 150 to the session data storage area 175 of mobile or wearable device 170 and/or the network cloud 112 as described above. In this manner, the stationary computing device 150 can perform a speculative upload of the user data based on a determination of the user's likely behavior. In an alternative embodiment, the user session data and/or user profile data can be periodically or continuously updated to the mobile or wearable computing device 170 and/or the network cloud 112. This alternative embodiment makes a quick exit more successful as the latency to complete the upload upon exit is reduced.

Figure 6:
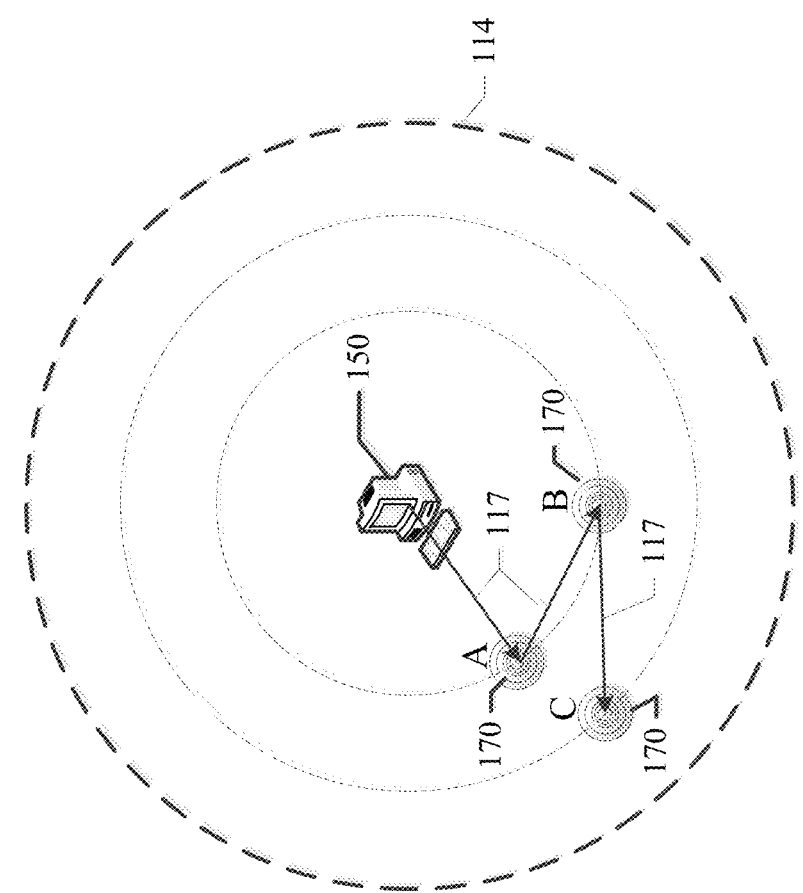
FIG. 6 illustrates an example embodiment wherein a path of motion or a motion vector is used to determine that a particular mobile device is unlikely to be departing the proximity zone.

Referring now to FIG. 6, an example embodiment is illustrated wherein a path of motion or a motion vector is used to determine that a particular mobile device is unlikely to be departing the proximity zone 114. For example, the received signal strength indication—RSSI—measured by the stationary device of the mobile device may remain relatively constant even though the mobile device is moving relative to the stationary device. As described above with reference to FIG. 5, the position of the mobile or wearable computing device 170 has been determined at times A, B, and C. The resulting motion vector 116 was produced. The motion vector 116 indicated that the path and speed of the mobile or wearable computing device 170 is indicative of and consistent with the behavior of a user who is finished using a particular stationary computing device 150 and is likely intending to depart the proximity zone 114. In contrast, with reference to FIG. 6, the position of the mobile or wearable computing device 170 has been determined at times A, B, and C. The resulting motion vector 117 has been produced. The motion vector 117 indicates that the path and/or speed of the mobile or wearable computing device 170 is not indicative of or consistent with the behavior of a user who is finished using a particular stationary computing device 150 or is likely intending to depart the proximity zone 114. As a result of this determination, the stationary computing device 150 can suppress or suspend the uploading of the user's session and profile data to the mobile or wearable computing device 170 and/or the network cloud 112 as described above. In this manner, the stationary computing device 150 can perform a speculative analysis of the user's likely behavior and preserve computing resources when an upload of the user's session and profile data is not necessary.

Figure 7:
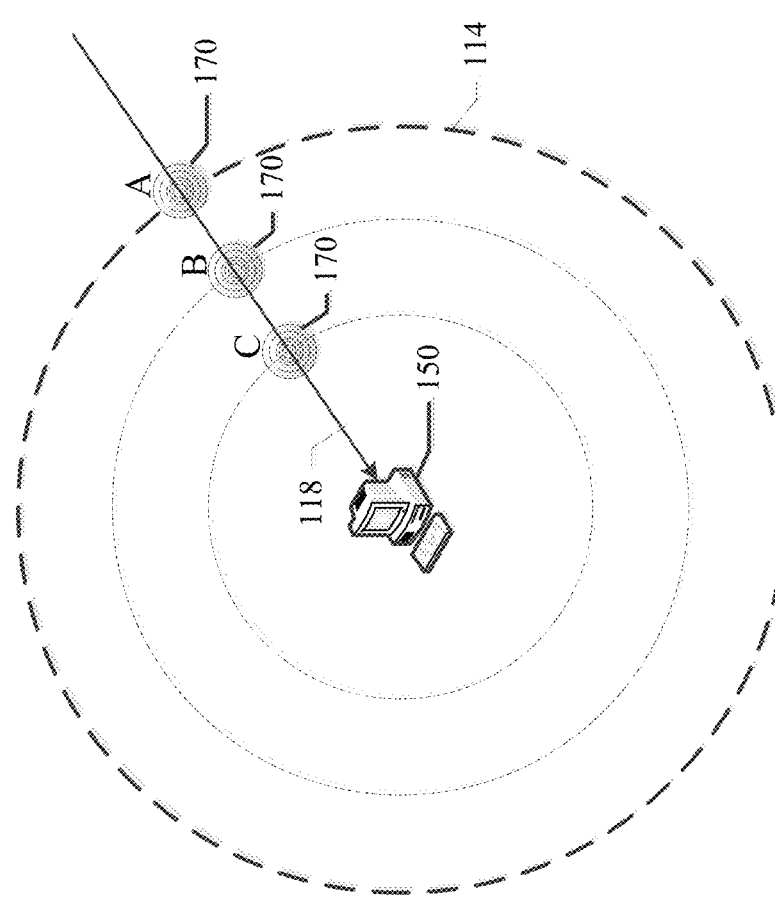
FIG. 7 illustrates an example embodiment wherein a path of motion or a motion vector is used to determine that a particular mobile device is likely on a path entering the proximity zone and likely to be approaching a stationary computing device for log in by a user.

Referring now to FIG. 7, an example embodiment is illustrated wherein a path of motion or a motion vector is used to determine that a particular mobile device is likely on a path entering the proximity zone 114 and likely to be approaching the stationary computing device 150 for log in by a user. As described above, the physical location of the mobile or wearable computing device 170 can be determined as an absolute physical location or as a physical location relative to the location of the stationary computing device 150 using a variety of techniques. In this manner, the presence and location of a mobile or wearable computing device 170 as the device enters the proximity zone 114 of the stationary computing device 150 can be detected. As shown in FIG. 7, the physical location of the mobile or wearable computing device 170 within the proximity zone 114 can be determined at pre-defined time intervals, A, B, and C. Given the physical position of the mobile or wearable computing device 170 and the time at the corresponding position for at least two time intervals, the speed and direction of travel can be determined for the mobile or wearable computing device 170. This speed and direction can be represented as a motion vector 118 as shown in FIG. 7. This motion vector 118 can be used by the stationary computing device 150 to determine if it is likely that a user is approaching a particular stationary computing device 150 and is likely intending to initiate log in and operation of the particular stationary computing device 150. In the example shown in FIG. 7, the position of the mobile or wearable computing device 170 has been determined at times A, B, and C. The resulting motion vector 118 has been produced. The motion vector 118 indicates that the path and speed of the mobile or wearable computing device 170 is indicative of and consistent with the behavior of a user who is approaching a stationary computing device 150 and is likely intending to initiate log in and operation of the stationary computing device 150. One indicia of this likely user behavior is the fact that the motion vector 118 in the example of FIG. 7 points directly toward the stationary computing device 150. As a result of this determination of a likely approach and operation of the stationary computing device 150, the stationary computing device 150 can initiate a download of user session data and user profile data from the session data storage area 175 of mobile or wearable device 170 and/or the network cloud 112 to the stationary computing device 150 as described above. In this manner, the stationary computing device 150 can perform a speculative download of the user data based on a determination of the user's likely behavior. This downloaded user data can be used at the stationary computing device 150 to recreate a computing session on the current stationary computing device 150 that is identical or near identical to a computing session left behind on a prior computing device. Additionally, the downloaded user profile or affinity data can be used for identifying items, attractions, or preferences that are applicable to the user and the user's current situation.

Figure 8:
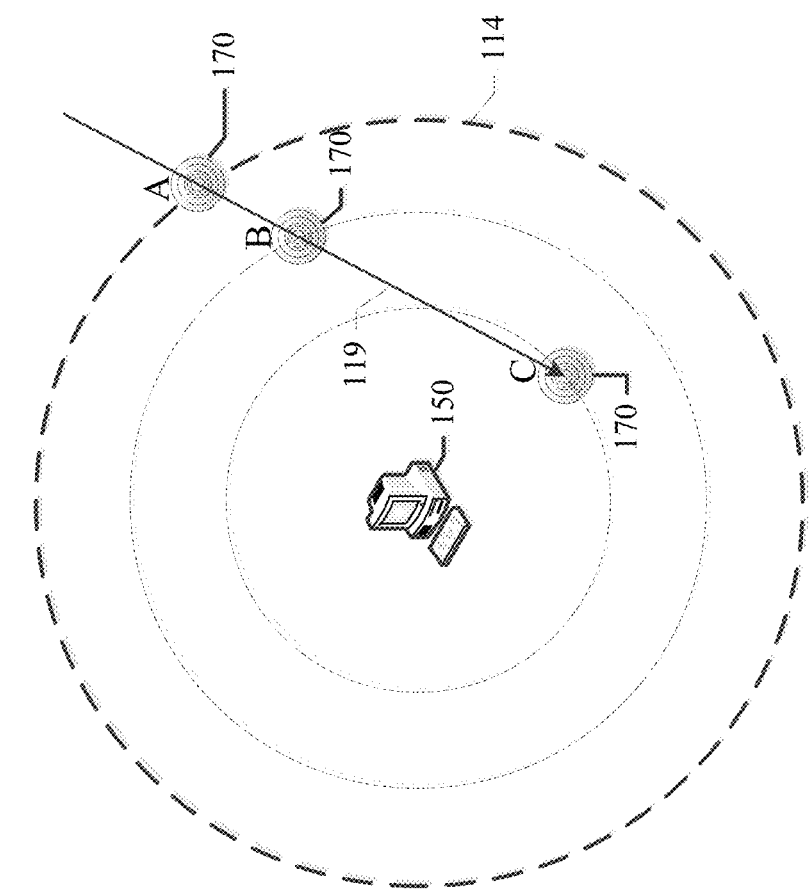
FIG. 8 illustrates an example embodiment wherein a path of motion or a motion vector is used to determine that a particular mobile device is likely on a path entering the proximity zone but unlikely to be approaching a stationary computing device for log in by a user.

Referring now to FIG. 8, an example embodiment is illustrated wherein a path of motion or a motion vector is used to determine that a particular mobile device is likely on a path entering the proximity zone 114 but unlikely to be approaching the stationary computing device 150 for log in by a user. As described above with reference to FIG. 7, the position of the mobile or wearable computing device 170 has been determined at times A, B, and C. The resulting motion vector 118 was produced. The motion vector 118 indicated that the path and speed of the mobile or wearable computing device 170 is indicative of and consistent with the behavior of a user who is approaching a stationary computing device 150 and is likely intending to initiate log in and operation of the stationary computing device 150. In contrast, with reference to FIG. 8, the position of the mobile or wearable computing device 170 has been determined at times A, B, and C. The resulting motion vector 119 has been produced. The motion vector 119 indicates that the path and/or speed of the mobile or wearable computing device 170 is not indicative of or consistent with the behavior of a user who is approaching a stationary computing device 150 and is likely intending to initiate log in and operation of the stationary computing device 150. One indicia of this likely user behavior is the fact that the motion vector 119 in the example of FIG. 8 does not point directly toward the stationary computing device 150. As a result of this determination, the stationary computing device 150 can suppress or suspend the downloading of the user's session and profile data from the mobile or wearable computing device 170 and/or the network cloud 112 to the stationary computing device 150 as described above. In this manner, the stationary computing device 150 can perform a speculative analysis of the user's likely behavior and preserve computing resources when a download of the user's session and profile data is not necessary.

Figure 9:
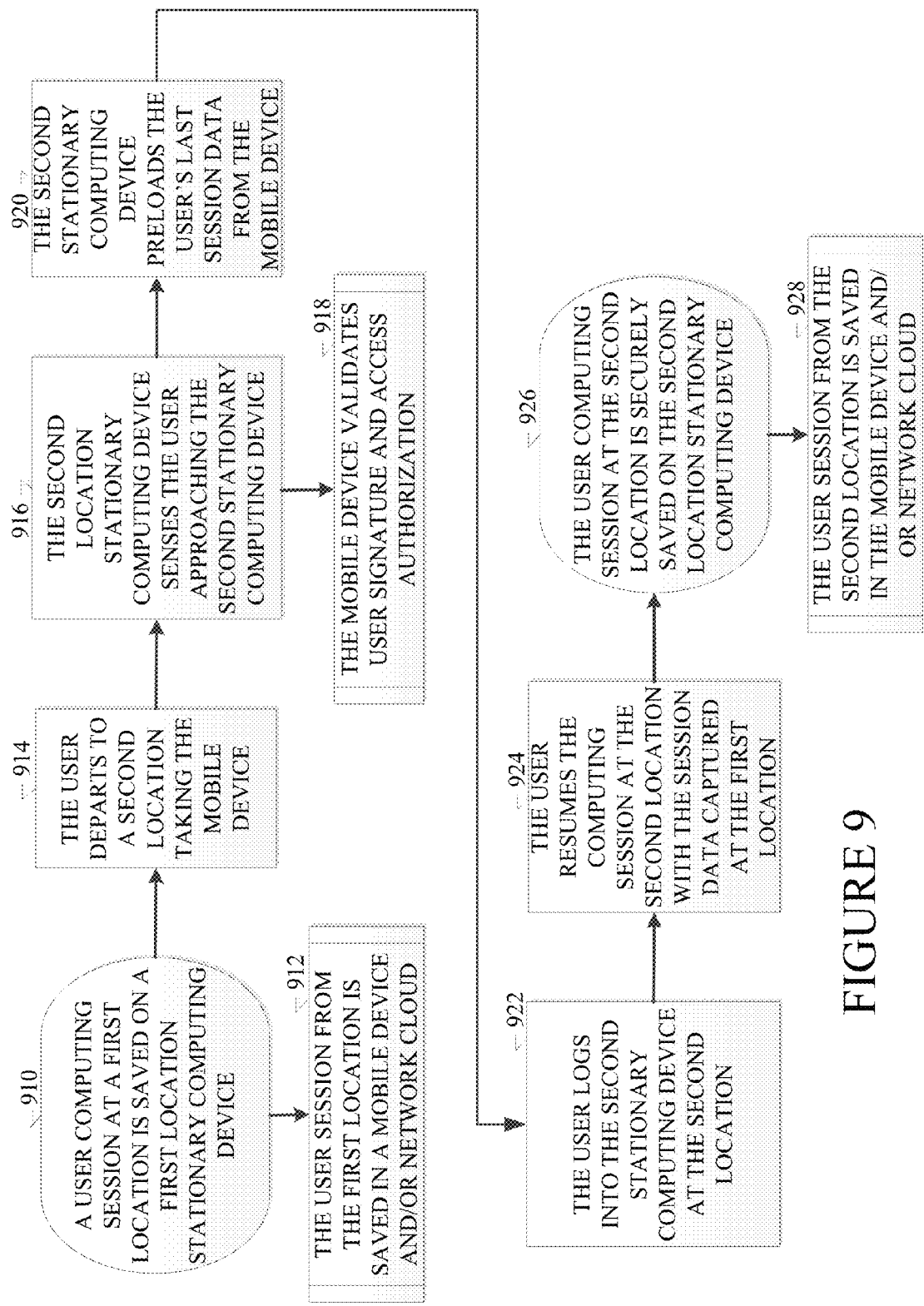
FIGS. 9 through 11 depict a subset of the usage models (e.g., access point usage) of various example embodiments.
Figure 10:
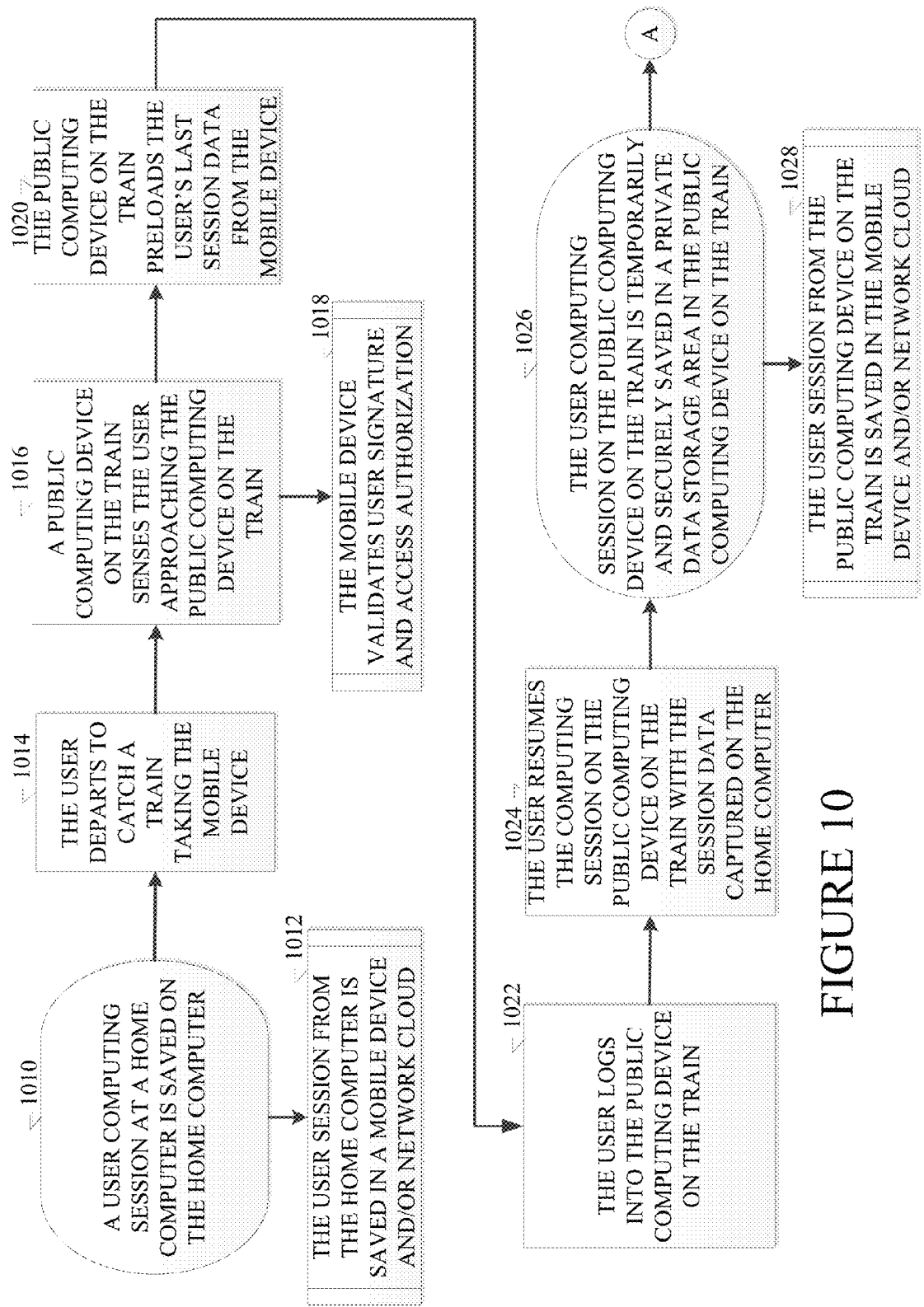
Figure 11:
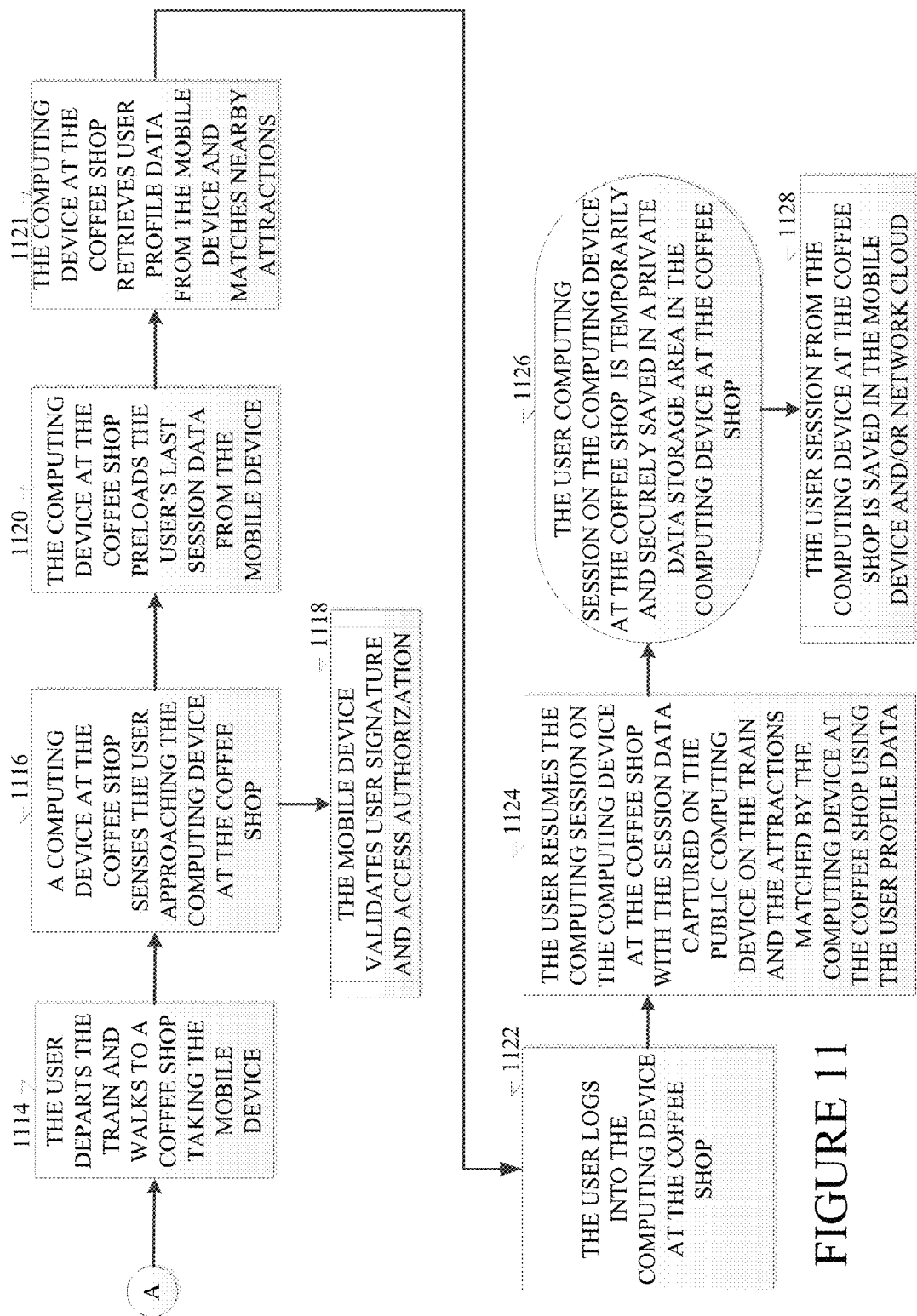

FIGS. 9 through 11 depict a subset of the usage models (e.g., access point usage) of various example embodiments. In particular, FIGS. 9 through 11 present examples of typical scenarios wherein a user holding or wearing a mobile or wearable computing device encounters stationary computing devices at various locations. These encounters and the manner in which the user session data and profile data is automatically transferred between computing devices by the various embodiments described herein highlight the versatility and beneficial use of the various embodiments.

Referring now to FIG. 9, a user computing session at a first location is saved on a first location stationary computing device (processing block 910). The user session from the first location is also saved in a data storage area of a mobile or wearable device and/or the network cloud (processing block 912) as described above. The user departs to a second location taking or wearing the mobile or wearable device (processing block 914). The second location stationary computing device senses or detects the user (with the mobile or wearable device) approaching the second stationary computing device as described above (processing block 916). The mobile or wearable device validates a user signature and performs an access authorization (processing block 918). The user signature validation and access authorization can be performed by the data transfer and authentication logic 174 of the mobile or wearable device 170. The user signature validation and access authorization ensures that the mobile or wearable device does not share user data with devices that are not authorized for sharing by the user. Once the mobile or wearable device authorizes the user data transfer, the second stationary computing device preloads the user's last session data and profile data from the mobile or wearable device (processing block 930). The user logs into the second stationary computing device at the second location (processing block 922). Given the preloaded user data, the user resumes the computing session at the second location with the session data captured at the first location (processing block 924). The second stationary computing device can use the session data from the mobile or wearable device and/or the network cloud to recreate the prior user session in the best manner possible, given the computing resources available on the second stationary computing device. If the second stationary computing device does not support some devices, resources, or applications specified in the session data from the first stationary computing device, the second stationary computing device can merely avoid activating these unsupported portions of the session data. In other respects, the recreated session on the second stationary computing device can be identical or nearly identical to the computing session on the first computing device. The user computing session at the second location can be securely saved on the second location stationary computing device (processing block 926). The user session from the second location can also be saved in the mobile or wearable device and/or the network cloud (processing block 928). Thus, the various embodiments described herein enable a user to seamlessly move between computing devices and the session data, context data, and user profile data follows the user.

Referring now to FIGS. 10 and 11, a sample use scenario is presented wherein a user encounters multiple stationary computing devices in a public setting. Referring to FIG. 10, a user computing session at a home computer can be saved on the home computer (processing block 1010). The user session from the home computer is also saved in a mobile or wearable computing device and/or network cloud (processing block 1012) as described above. In this sample usage scenario, the user departs to catch a train taking the mobile or wearable computing device (processing block 1014). A public computing device on the train senses or detects the user approaching the public computing device on the train as described above (processing block 1016). The mobile or wearable computing device validates a user signature and provides access authorization (processing block 1018). The public computing device on the train automatically preloads the user's last session data from the mobile or wearable computing device as described above (processing block 1020). The user logs into the public computing device on the train (processing block 1022). The user resumes the computing session on the public computing device on the train with the session data captured on the home computer and automatically transferred via the mobile or wearable computing device as described above (processing block 1024). The user computing session on the public computing device on the train is temporarily and securely saved in a private data storage area in the public computing device on the train (processing block 1026). The user session from the public computing device on the train is also saved in the mobile or wearable computing device and/or network cloud (processing block 1028).

Referring to FIG. 11, in a continuation of the example usage scenario presented in relation to FIG. 10, the user departs the train and walks to a coffee shop taking the mobile or wearable computing device (processing block 1114). A computing device at the coffee shop senses or detects the user approaching the computing device at the coffee shop (processing block 1116) as described above. The mobile or wearable computing device validates the user signature and provides access authorization (processing block 1118). The computing device at the coffee shop automatically preloads the user's last session data from the mobile or wearable computing device as described above (processing block 1120). The computing device at the coffee shop can also retrieve user profile data from the mobile or wearable computing device and match nearby attractions (processing block 1121). The user logs into the computing device at the coffee shop (processing block 1122). The user resumes the computing session on the computing device at the coffee shop with the session data captured on the public computing device on the train and views the attractions matched by the computing device at the coffee shop using the user profile data (processing block 1124). The user computing session on the computing device at the coffee shop is temporarily and securely saved in a private data storage area in the computing device at the coffee shop (processing block 1126). The user session from the computing device at the coffee shop is also saved in the mobile or wearable computing device and/or network cloud as described above (processing block 1128). Thus, the various embodiments described herein enable a user to seamlessly move between computing devices and the session data, context data, and user profile data follows the user. Additionally, the user profile data retained on the mobile or wearable computing device of a user can be used by a local computing system to match attractions available at particular nearby locations to the user using the user profile data. It will be apparent to those of ordinary skill in the art in view of the disclosure herein that although the examples of a public computing device on a train and in a coffee shop are described above in an example scenario, the various embodiments described herein are not limited thereto and are applicable to any public or private computing, communication, or hybrid devices.

Figure 12:
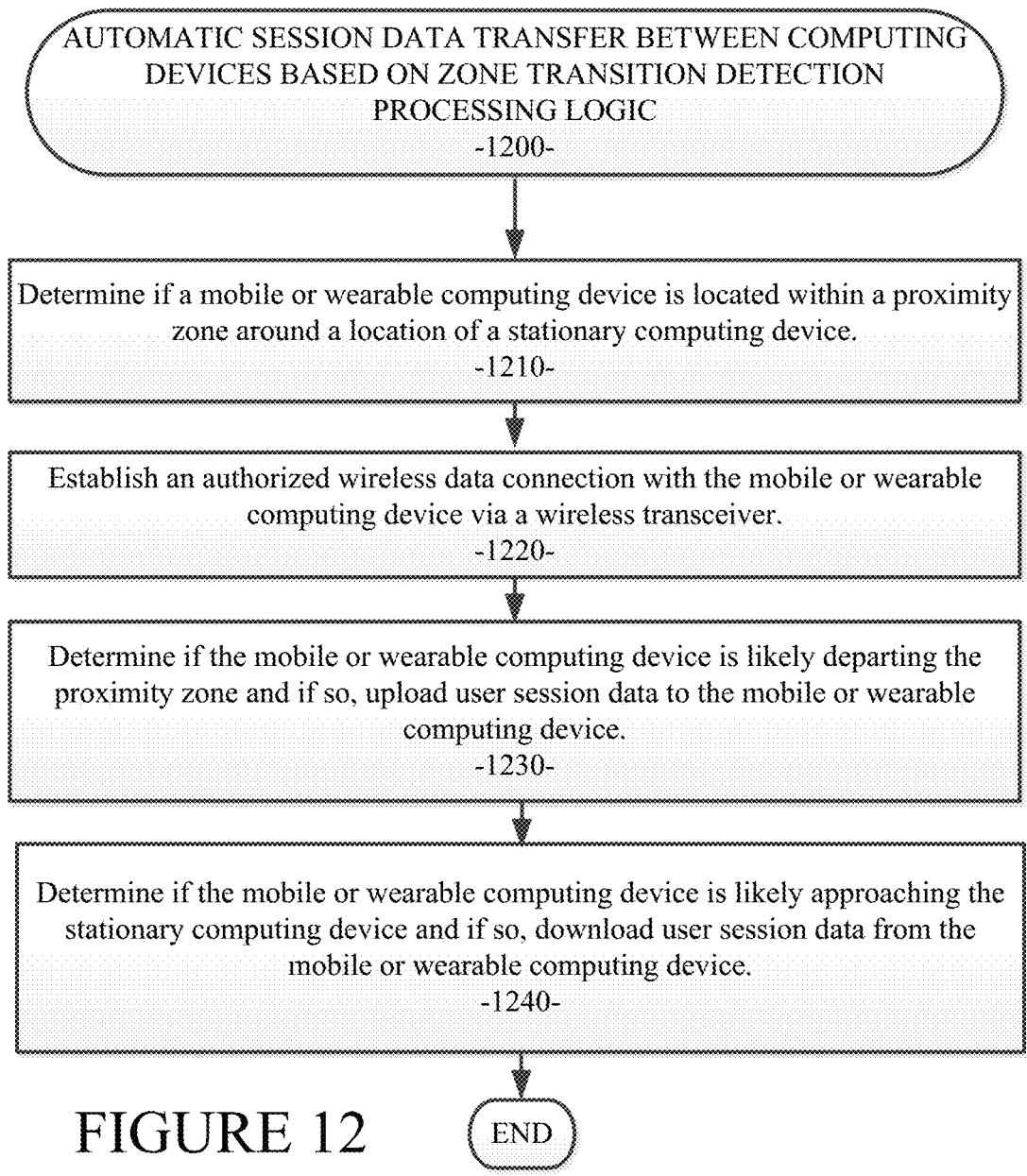
FIG. 12 is a processing flow chart illustrating an example embodiment of a method as described herein.

Referring now to FIG. 12, a processing flow diagram illustrates an example embodiment of a method for automatic session data transfer between computing devices based on zone transition detection as described herein. The method 1200 of an example embodiment is configured to: determine if a mobile or wearable computing device is located within a proximity zone around a location of a stationary computing device (processing block 1210); establish an authorized wireless data connection with the mobile or wearable computing device via a wireless transceiver (processing block 1220); determine if the mobile or wearable computing device is likely departing the proximity zone and if so, upload user session data to the mobile or wearable computing device (processing block 1230); and determine if the mobile or wearable computing device is likely approaching the stationary computing device and if so, download user session data from the mobile or wearable computing device (processing block 1240).

Figure 13:
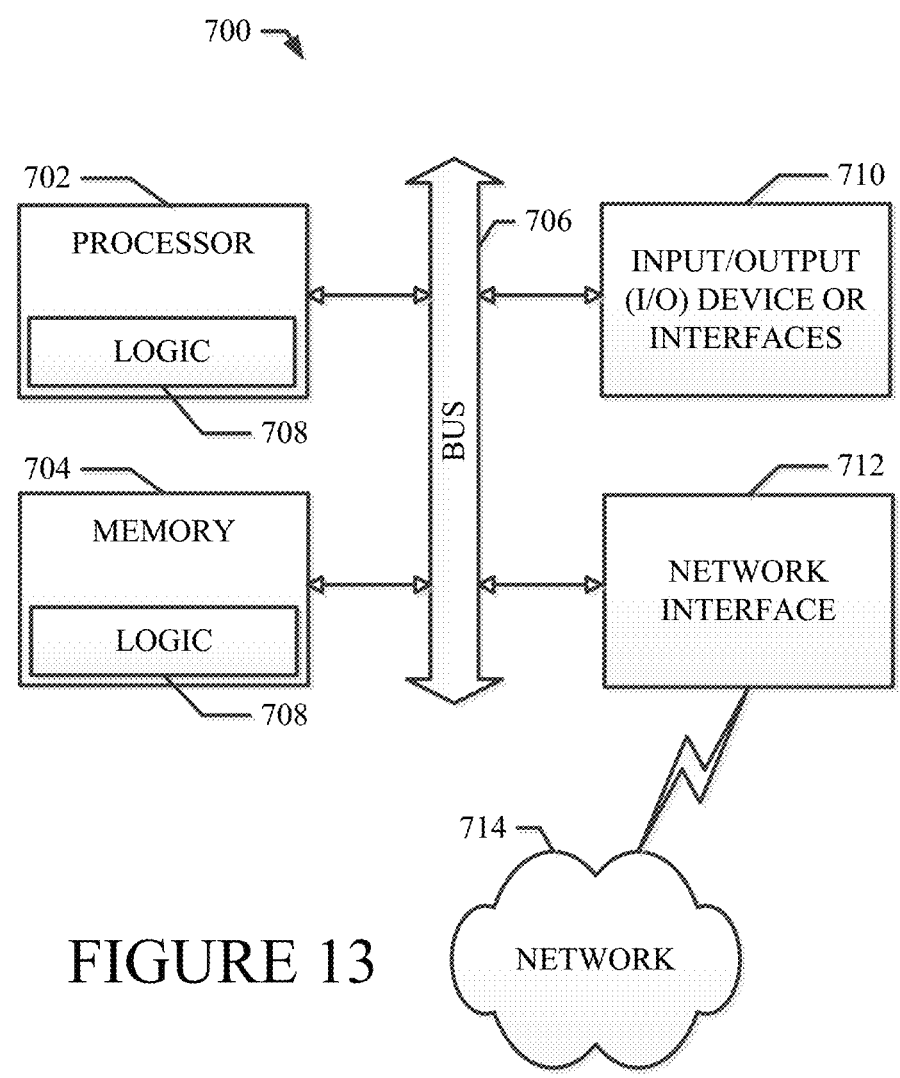
FIG. 13 shows a diagrammatic representation of a machine in the example form of a mobile computing and/or communication system within which a set of instructions when executed and/or processing logic when activated may cause the machine to perform any one or more of the methodologies described and/or claimed herein.

FIG. 13 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

A mobile or wearable computing device comprising:
a data processor;
a memory coupled with the data processor for persistent user data storage;
a wireless transceiver in data communication with the data processor;
a unique user identifier storable in the memory; and
logic, at least a portion of which is partially implemented in hardware, the logic configured to wirelessly receive an upload of user session data from a first computing device via the wireless transceiver, to store the user session data in the memory, to authenticate a second computing device using the unique user identifier, and to wirelessly download the user session data from the memory to the authenticated second computing device via the wireless transceiver, the user session data including data for recreating a computing session from the first computing device on the second computing device.

The mobile or wearable computing device as claimed above wherein the logic being further configured to wirelessly receive an upload of user profile data from the first computing device via the wireless transceiver, to store the user profile data in the memory, and to wirelessly download the user profile data from the memory to the authenticated second computing device via the wireless transceiver, the user profile data including data specifying a particular user's demographics, affinity, and preferences.

The mobile or wearable computing device as claimed above further including a geo-positioning system from the group consisting of: long range radio frequency identification (RFID) technology, and global positioning system or satellite (GPS) technology.

The mobile device as claimed above wherein the mobile or wearable computing device is a wearable device configured to be worn by a user.

A stationary computing device comprising:
a data processor;
a memory coupled with the data processor;
a wireless transceiver in data communication with the data processor; and
logic, at least a portion of which is partially implemented in hardware, the logic configured to determine if a mobile or wearable computing device is located within a proximity zone around a location of the stationary computing device, to establish an authorized wireless data connection with the mobile or wearable computing device via the wireless transceiver, to determine if the mobile or wearable computing device is likely departing the proximity zone and if so, uploading user session data to the mobile or wearable computing device, and to determine if the mobile or wearable computing device is likely approaching the stationary computing device and if so, downloading user session data from the mobile or wearable computing device, the user session data including data for recreating a computing session from the stationary computing device on a different computing device.

The stationary computing device as claimed above wherein the logic configured to determine if a mobile or wearable computing device is located within a proximity zone around a location of the stationary computing device being further configured to generate a motion vector based on motion of the mobile or wearable computing device.

The stationary computing device as claimed above wherein the logic configured to determine if the mobile or wearable computing device is likely departing the proximity zone being further configured to generate a motion vector based on motion of the mobile or wearable computing device, the motion vector being indicative of and consistent with a behavior of a user who is likely intending to depart the proximity zone.

The stationary computing device as claimed above wherein the logic configured to determine if the mobile or wearable computing device is likely approaching the stationary computing device being further configured to generate a motion vector based on motion of the mobile or wearable computing device, the motion vector being indicative of and consistent with a behavior of a user who is likely intending to approach the stationary computing device.

The stationary computing device as claimed above wherein the mobile or wearable computing device is a wearable device configured to be worn by a user.

A system comprising:
a stationary computing device including a first data processor, a first memory coupled with the first data processor, a first wireless transceiver in data communication with the first data processor, and first logic, at least a portion of which is partially implemented in hardware, the first logic configured to determine if a mobile or wearable computing device is located within a proximity zone around a location of the stationary computing device, to establish an authorized wireless data connection with the mobile or wearable computing device via the first wireless transceiver, to determine if the mobile or wearable computing device is likely departing the proximity zone and if so, uploading user session data to the mobile or wearable computing device, and to determine if the mobile or wearable computing device is likely approaching the stationary computing device and if so, downloading user session data from the mobile or wearable computing device; and
a mobile or wearable computing device including a second data processor, a second memory coupled with the second data processor, a second wireless transceiver in data communication with the second data processor, a unique user identifier storable in the second memory, and second logic, at least a portion of which is partially implemented in hardware, the second logic configured to wirelessly receive an upload of user session data from the stationary computing device via the second wireless transceiver, to store the user session data in the second memory, to authenticate the stationary computing device using the unique user identifier, and to wirelessly download the user session data from the second memory to the authenticated stationary computing device via the second wireless transceiver, the user session data including data for recreating a computing session from the stationary computing device on a different computing device.

The system as claimed above wherein the first logic configured to determine if a mobile or wearable computing device is located within a proximity zone around a location of the stationary computing device being further configured to generate a motion vector based on motion of the mobile or wearable computing device.

The system as claimed above wherein the first logic configured to determine if the mobile or wearable computing device is likely departing the proximity zone being further configured to generate a motion vector based on motion of the mobile or wearable computing device, the motion vector being indicative of and consistent with a behavior of a user who is likely intending to depart the proximity zone.

The system as claimed above wherein the first logic configured to determine if the mobile or wearable computing device is likely approaching the stationary computing device being further configured to generate a motion vector based on motion of the mobile or wearable computing device, the motion vector being indicative of and consistent with a behavior of a user who is likely intending to approach the stationary computing device.

The system as claimed above wherein the mobile or wearable computing device is a wearable device configured to be worn by a user.

The system as claimed above wherein the second logic being further configured to wirelessly receive an upload of user profile data from the stationary computing device via the second wireless transceiver, to store the user profile data in the second memory, and to wirelessly download the user profile data from the second memory to the authenticated stationary computing device via the second wireless transceiver, the user profile data including data specifying a particular user's demographics, affinity, and preferences.

The system as claimed above wherein the mobile or wearable computing device further including a geo-positioning system from the group consisting of: long range radio frequency identification (RFID) technology, and global positioning system or satellite (GPS) technology.

A non-transitory machine-useable storage medium embodying instructions which, when executed by a machine, cause the machine to:
  determine if a mobile or wearable computing device is located within a proximity zone around a location of a stationary computing device;
  establish an authorized wireless data connection with the mobile or wearable computing device via a wireless transceiver;
  determine if the mobile or wearable computing device is likely departing the proximity zone and if so, upload user session data to the mobile or wearable computing device; and
  determine if the mobile or wearable computing device is likely approaching the stationary computing device and if so, download user session data from the mobile or wearable computing device.

The machine-useable storage medium as claimed above being further configured to generate a motion vector based on motion of the mobile or wearable computing device.

The machine-useable storage medium as claimed above being further configured to generate a motion vector based on motion of the mobile or wearable computing device, the motion vector being indicative of and consistent with a behavior of a user who is likely intending to depart the proximity zone.

The machine-useable storage medium as claimed above being further configured to generate a motion vector based on motion of the mobile or wearable computing device, the motion vector being indicative of and consistent with a behavior of a user who is likely intending to approach the stationary computing device.

A method comprising:
  determining if a mobile or wearable computing device is located within a proximity zone around a location of a stationary computing device;
  establishing an authorized wireless data connection with the mobile or wearable computing device via a wireless transceiver;
  determining if the mobile or wearable computing device is likely departing the proximity zone and if so, uploading user session data to the mobile or wearable computing device; and
  determining if the mobile or wearable computing device is likely approaching the stationary computing device and if so, downloading user session data from the mobile or wearable computing device.

The method as claimed above including generating a motion vector based on motion of the mobile or wearable computing device.

The method as claimed above including generating a motion vector based on motion of the mobile or wearable computing device, the motion vector being indicative of and consistent with a behavior of a user who is likely intending to depart the proximity zone.

The method as claimed above including generating a motion vector based on motion of the mobile or wearable computing device, the motion vector being indicative of and consistent with a behavior of a user who is likely intending to approach the stationary computing device.

An apparatus comprising:
  a data processing means;
  a memory means coupled with the data processing means for persistent user data storage;
  a wireless communication means in data communication with the data processing means;
  a unique user identification means storable in the memory means; and
  logic means, at least a portion of which is partially implemented in hardware, the logic means configured to wirelessly receive an upload of user session data from a first computing device via the wireless communication means, to store the user session data in the memory means, to authenticate a second computing device using the unique user identification means, and to wirelessly download the user session data from the memory means to the authenticated second computing device via the wireless communication means, the user session data including data for recreating a computing session from the first computing device on the second computing device.

The apparatus as claimed above wherein the logic means being further configured to wirelessly receive an upload of user profile data from the first computing device via the wireless communication means, to store the user profile data in the memory means, and to wirelessly download the user profile data from the memory means to the authenticated second computing device via the wireless communication means, the user profile data including data specifying a particular user's demographics, affinity, and preferences.

The apparatus as claimed above further including a geo-positioning means from the group consisting of: long range radio frequency identification (RFID) technology, and global positioning system or satellite (GPS) technology.

The apparatus as claimed above wherein the apparatus is a wearable device configured to be worn by a user.

An apparatus comprising:
  a data processing means;
  a memory means coupled with the data processing means;
  a wireless communication means in data communication with the data processing means; and
  logic means, at least a portion of which is partially implemented in hardware, the logic means configured to determine if a mobile or wearable computing device is located within a proximity zone around a location of the stationary computing device, to establish an authorized wireless data connection with the mobile or wearable computing device via the wireless communication means, to determine if the mobile or wearable computing device is likely departing the proximity zone and if so, uploading user session data to the mobile or wearable computing device, and to determine if the mobile or wearable computing device is likely approaching the stationary computing device and if so, downloading user session data from the mobile or wearable computing device, the user session data including data for recreating a computing session from the stationary computing device on a different computing device.

The apparatus as claimed above wherein the logic means being further configured to determine if a mobile or wearable computing device is located within a proximity zone around a location of the stationary computing device being further configured to generate a motion vector based on motion of the mobile or wearable computing device.

The apparatus as claimed above wherein the logic means being further configured to determine if the mobile or wearable computing device is likely departing the proximity zone being further configured to generate a motion vector based on motion of the mobile or wearable computing device, the motion vector being indicative of and consistent with a behavior of a user who is likely intending to depart the proximity zone.

The apparatus as claimed above wherein the logic means being further configured to determine if the mobile or wearable computing device is likely approaching the stationary computing device being further configured to generate a motion vector based on motion of the mobile or wearable computing device, the motion vector being indicative of and consistent with a behavior of a user who is likely intending to approach the stationary computing device.

The apparatus as claimed above wherein the mobile or wearable computing device is a wearable device configured to be worn by a user.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A secondary computing device comprising:
   a data processor;
   a memory coupled with the data processor;
   a wireless transceiver in data communication with the data processor; and
   logic, at least a portion of which is partially implemented in hardware, the logic configured to determine if a mobile or wearable computing device is located within a proximity zone around a location of the secondary computing device, to establish an authorized wireless data connection with the mobile or wearable computing device via the wireless transceiver, to generate a motion vector based on motion of the mobile or wearable computing device through the proximity zone, to determine if the mobile or wearable computing device is likely departing the proximity zone based on the generated motion vector and if so, uploading user session data of the mobile or wearable computing device, the uploading of the user session data being performed automatically, speculatively, without explicit user input, and in response to the determination that the mobile or wearable computing device is likely departing the proximity zone, and to determine if the mobile or wearable computing device is likely approaching the secondary computing device based on the generated motion vector and if so, downloading user session data of the mobile or wearable computing device, the downloading of the user session data being performed automatically, speculatively, without explicit user input, and in response to the determination that the mobile or wearable computing device is likely approaching the proximity zone, the user session data including data for recreating a computing session from the secondary computing device on a different computing device.

2. The secondary computing device of claim 1 wherein the logic being further configured to wirelessly transfer user profile data to or from the mobile or wearable computing device, the user profile data including data specifying a particular user's demographics, affinity, and preferences.

3. The secondary computing device as claimed in of claim 1 wherein the mobile or wearable computing device further including a geo-positioning system from the group consisting of: long range radio frequency identification (RFID) technology, and global positioning system or satellite (GPS) technology.

4. The secondary computing device of claim 1 wherein the user session data being stored in a network cloud.

5. The secondary computing device of claim 1 wherein the mobile or wearable computing device is a wearable device configured to be worn by a user.

6. A system comprising:
   a secondary computing device including a first data processor, a first memory coupled with the first data processor, a first wireless transceiver in data communication with the first data processor, and first logic, at least a portion of which is partially implemented in hardware, the first logic configured to determine if a mobile or wearable computing device is located within a proximity zone around a location of the secondary computing device, to establish an authorized wireless data connection with the mobile or wearable computing device via the first wireless transceiver, to generate a motion vector based on motion of the mobile or wearable computing device through the proximity zone, to determine if the mobile or wearable computing device is likely departing the proximity zone based on the generated motion vector and if so, uploading user session data of the mobile or wearable computing device, the uploading of the user session data being performed automatically, speculatively, without explicit user input, and in response to the determination that the mobile or wearable computing device is likely departing the proximity zone, and to determine if the mobile or wearable computing device is likely approaching the secondary computing device based on the generated motion vector and if so, downloading user session data of the mobile or wearable computing device, the downloading of the user session data being performed automatically, speculatively, without explicit user input, and in response to the determination that the mobile or wearable computing device is likely approaching the proximity zone; and
   a mobile or wearable computing device including a second data processor, a second memory coupled with the second data processor, a second wireless transceiver in data communication with the second data processor, a unique user identifier storable in the second memory, and second logic, at least a portion of which is partially implemented in hardware, the second logic configured to wirelessly receive an upload of user session data from the secondary computing device via the second wireless transceiver, to store the user session data in the second memory, to authenticate the secondary computing device using the unique user identifier, and to wirelessly download the user session data from the second memory to the authenticated secondary computing device via the second wireless transceiver, the user session data including data for recreating a computing session from the secondary computing device on a different computing device.

7. The system as claimed in claim 6 wherein the user session data being stored in a network cloud.

8. The system of claim 6 wherein the mobile or wearable computing device is a wearable device configured to be worn by a user.

9. The system of claim 6 wherein the second logic being further configured to wirelessly receive an upload of user profile data from the secondary computing device via the second wireless transceiver, to store the user profile data in the second memory, and to wirelessly download the user profile data from the second memory to the authenticated secondary computing device via the second wireless transceiver, the user profile data including data specifying a particular user's demographics, affinity, and preferences.

10. The system of claim 6 wherein the mobile or wearable computing device further including a geo-positioning system from the group consisting of: long range radio frequency identification (RFID) technology, and global positioning system or satellite (GPS) technology.

11. A non-transitory machine-useable storage medium embodying instructions which, when executed by a machine, cause the machine to:
- determine if a mobile or wearable computing device is located within a proximity zone around a location of a secondary computing device;
- establish an authorized wireless data connection with the mobile or wearable computing device via a wireless transceiver;
- generate a motion vector based on motion of the mobile or wearable computing device through the proximity zone;
- determine if the mobile or wearable computing device is likely departing the proximity zone based on the generated motion vector and if so, upload user session data of the mobile or wearable computing device, the uploading of the user session data being performed automatically, speculatively, without explicit user input, and in response to the determination that the mobile or wearable computing device is likely departing the proximity zone; and
- determine if the mobile or wearable computing device is likely approaching the secondary computing device based on the generated motion vector and if so, download user session data of the mobile or wearable computing device, the downloading of the user session data being performed automatically, speculatively, without explicit user input, and in response to the determination that the mobile or wearable computing device is likely approaching the proximity zone.

12. The machine-useable storage medium of claim 11 wherein the mobile or wearable computing device is a wearable device configured to be worn by a user.

13. The machine-useable storage medium of claim 11 being further configured to wirelessly transfer user profile data to or from the mobile or wearable computing device, the user profile data including data specifying a particular user's demographics, affinity, and preferences.

14. The machine-useable storage medium of claim 11 wherein the mobile or wearable computing device further including a geo-positioning system from the group consisting of: long range radio frequency identification (RFID) technology, and global positioning system or satellite (GPS) technology.

15. The machine-useable storage medium of claim 11 wherein the user session data being stored in a network cloud.

* * * * *